US012768806B2

(12) United States Patent
Pieleanu et al.

(10) Patent No.: US 12,768,806 B2
(45) Date of Patent: Oct. 20, 2026

(54) ENHANCED OFFSET COMPENSATION TECHNIQUE FOR THERMAL CONDUCTIVITY SENSING OF A GAS CONCENTRATION SENSOR

(71) Applicant: Infineon Technologies AG, Neubiberg (DE)

(72) Inventors: Silviu-Antonio Pieleanu, Bucharest (RO); Dan Ioan Dumitru Stoica, Bucharest (RO); Dan-Alexandru Mocanu, Bucharest (RO)

(73) Assignee: Infineon Technologies AG, Neubiberg (DE)

( * ) Notice: Subject to any disclaimer, the term of this patent is extended or adjusted under 35 U.S.C. 154(b) by 216 days.

(21) Appl. No.: 18/817,806

(22) Filed: Aug. 28, 2024

(65) Prior Publication Data

US 2025/0093288 A1 Mar. 20, 2025

(30) Foreign Application Priority Data

Sep. 14, 2023 (DE) ........................ 102023208932.7

(51) Int. Cl.
*G01N 27/12* (2006.01)

(52) U.S. Cl.
CPC .................................. *G01N 27/122* (2013.01)

(58) Field of Classification Search
CPC ....... G01N 27/122; G01N 27/18; G01N 25/20
USPC .......................................................... 324/693
See application file for complete search history.

(56) References Cited

U.S. PATENT DOCUMENTS

| | | | | |
|---|---|---|---|---|
| 2006/0042351 A1* | 3/2006 | Liu | .................... | G01N 27/4163<br>73/1.06 |
| 2020/0355636 A1* | 11/2020 | Rogers | ................. | G01N 29/022 |
| 2025/0076266 A1* | 3/2025 | Steiner | ............... | G01N 33/0006 |
| 2025/0093288 A1* | 3/2025 | Pieleanu | ................ | G01N 27/18 |

FOREIGN PATENT DOCUMENTS

| | | | | |
|---|---|---|---|---|
| DE | 69528775 T2 | 7/2003 | | |
| DE | 60030333 T2 | 10/2007 | | |
| DE | 102020214581 A1 | 5/2022 | | |
| EP | 4502582 A1 * | 2/2025 | ............. | G01D 21/02 |

(Continued)

*Primary Examiner* — Arleen M Vazquez
*Assistant Examiner* — Robert P Alejnikov, Jr.
(74) *Attorney, Agent, or Firm* — Harrity & Harrity, LLP

(57) ABSTRACT

A gas concentration sensor configured to measure a gas concentration of a target gas includes a reference chamber configured to contain a reference gas; a measurement chamber configured to contain the target gas; and a measurement circuit, configurable in a calibration mode and an operational mode, including a resistive bridge circuit including a first resistive element arranged in the reference chamber and a second resistive element arranged in the measurement chamber. The resistive bridge circuit is configured to receive an input voltage and generate a measurement signal based on the input voltage. During the calibration mode, the input voltage has a first voltage value at which the resistive bridge circuit has a negligible sensitivity to thermal conductivity such that the measurement signal is representative of an offset. The measurement circuit is configured to, during the operational mode, subtract the offset from the measurement signal to generate a compensated measurement signal.

20 Claims, 2 Drawing Sheets

(56) References Cited

FOREIGN PATENT DOCUMENTS

| | | | | | |
|---|---|---|---|---|---|
| EP | 4502585 | A1 | * | 2/2025 | ............. G01D 21/02 |
| JP | 2016042054 | A | * | 3/2016 | |
| WO | WO-2015172974 | A1 | * | 11/2015 | ........... G01F 1/6965 |

* cited by examiner

ENHANCED OFFSET COMPENSATION TECHNIQUE FOR THERMAL CONDUCTIVITY SENSING OF A GAS CONCENTRATION SENSOR

CROSS-REFERENCE TO RELATED APPLICATION

This application claims priority to Germany Patent Application No. 102023208932.7 filed on Sep. 14, 2023, the content of which is incorporated by reference herein in its entirety.

BACKGROUND

There is an increasing demand for reducing the consumption of petroleum and shifting to using green energy. For example, hydrogen generated by wind turbines is considered as a possible green fuel for automotive applications.

Sensors may be required to detect any leaking hydrogen to avoid the formation of oxyhydrogen. Sensors for measuring a gas property, which may also be called gas sensors, may have a cross-sensitivity to different environment characteristics, such as humidity, temperature, and/or flow and concentration of the gas to be sensed. In some cases, dedicated sensors for these additional properties may have to be included in order to differentiate the signal of interest. For example, a complementary temperature sensor may have to be added. This may lead to a complex device, where different dies or sensing elements have to be combined inside a package.

SUMMARY

In some implementations, a gas concentration sensor configured to measure a gas concentration of a target gas includes a reference chamber configured to contain a reference gas; a measurement chamber configured to contain a target gas that is different from the reference gas; and a measurement circuit configurable in a calibration mode and an operational mode, the measurement circuit including: a full-bridge circuit including a first piezoresistive wire arranged in the reference chamber and exposed to the reference gas, a second piezoresistive wire arranged in the reference chamber and exposed to the reference gas, a third piezoresistive wire arranged in the measurement chamber and exposed to the target gas, and a fourth piezoresistive wire arranged in the measurement chamber and exposed to the target gas, wherein the full-bridge circuit is configured to receive an input voltage and generate a differential signal based on the input voltage, wherein, during the calibration mode, the input voltage has a first voltage value at which the full-bridge circuit has a negligible sensitivity to thermal conductivity such that the differential signal is representative of an offset, wherein, during the operational mode, the input voltage has a second voltage value at which the full-bridge circuit is sensitive to thermal conductivity with an operational sensitivity such that the differential signal is representative of a thermal conductivity of the target gas, wherein the measurement circuit is configured to, during the calibration mode, measure the offset based on the differential signal, and wherein the measurement circuit is configured to, during the operational mode, subtract the offset from the differential signal to generate a compensated differential signal.

In some implementations, a gas concentration sensor configured to measure a gas concentration of a target gas includes a reference chamber configured to contain a reference gas; a measurement chamber configured to contain the target gas that is different from the reference gas; and a measurement circuit configurable in a calibration mode and an operational mode, the measurement circuit including: a resistive bridge circuit including a plurality of resistive elements, including at least one first resistive element arranged in the reference chamber and at least one second resistive element arranged in the measurement chamber, wherein the resistive bridge circuit is configured to receive an input voltage and generate a measurement signal based on the input voltage, wherein, during the calibration mode, the input voltage has a first voltage value at which the resistive bridge circuit has a negligible sensitivity to thermal conductivity such that the measurement signal is representative of an offset, wherein, during the operational mode, the input voltage has a second voltage value at which the resistive bridge circuit is sensitive to thermal conductivity with an operational sensitivity such that the measurement signal is representative of a thermal conductivity of the target gas, wherein the measurement circuit is configured to, during the calibration mode, measure the offset based on the measurement signal, and wherein the measurement circuit is configured to, during the operational mode, subtract the offset from the measurement signal to generate a compensated measurement signal.

In some implementations, a method of calibrating an offset of a gas concentration sensor includes configuring a measurement circuit of the gas concentration sensor in a calibration mode; applying, during the calibration mode, a first input voltage to a resistive bridge circuit of the gas concentration sensor to cause the resistive bridge circuit to generate a first measurement signal, wherein, based on the first input voltage, the resistive bridge circuit has a negligible sensitivity to thermal conductivity such that the first measurement signal is representative of the offset; configuring, during the calibration mode, a compensation component of the measurement circuit with the offset derived from the first measurement signal; configuring the measurement circuit of the gas concentration sensor in an operational mode; applying, during the operational mode, a second input voltage to the resistive bridge circuit of the gas concentration sensor to cause the resistive bridge circuit to generate a second measurement signal, wherein the second input voltage is greater than the first input voltage, and wherein, based on the second input voltage, the resistive bridge circuit is sensitive to thermal conductivity with an operational sensitivity such that the second measurement signal is representative of a thermal conductivity of a measurement gas; and subtracting, during the operational mode, the offset configured at the compensation component from the second measurement signal to generate a compensated measurement signal.

BRIEF DESCRIPTION OF THE DRAWINGS

Implementations are described herein with reference to the appended drawings.

DETAILED DESCRIPTION

Figure 1:
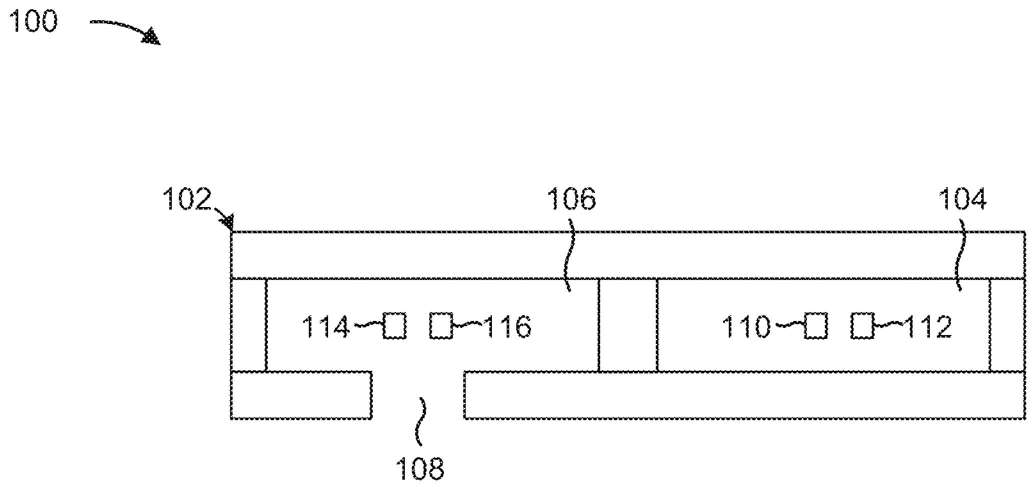
FIG. 1 illustrates a gas sensor according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view, rather than in detail, in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually interchangeable.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling (e.g., any connection or coupling without additional intervening elements) may also be implemented by an indirect connection or coupling (e.g., a connection or coupling with one or more additional intervening elements, or vice versa) as long as the general purpose of the connection or coupling (e.g., to transmit a certain kind of signal or to transmit a certain kind of information) is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, a signal with an approximate signal value may practically have a signal value within 5% of the approximate signal value.

In the present disclosure, expressions including ordinal numbers, such as "first", "second", and/or the like, may modify various elements. However, such elements are not limited by such expressions. For example, such expressions do not limit the sequence and/or importance of the elements. Instead, such expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A "sensor" may refer to a component which converts a property to be measured to an electrical signal (e.g., a current signal or a voltage signal). The property to be measured may, for example, comprise a magnetic field, an electric field, an electromagnetic wave (e.g., a radio wave), a pressure, a force, a current, or a voltage, but is not limited thereto. A gas sensor may measure a property of a gas, such as a thermal conductivity of the gas. Based on the measured property, a presence of the gas can be detected. Additionally, based on the measured property, a concentration of the gas can be measured.

For example, a gas sensor may measure the thermal conductivity of a target gas by heating up four resistive wires connected in a Wheatstone bridge configuration (e.g., a full bridge resistive circuit), with two reference resistive wires isolated in a stable reference gas and two sense resistive wires exposed to a measurement gas, which may include the target gas. The four resistive wires may undergo a temperature change (e.g., a temperature increase) by applying a voltage across two input terminals of the Wheatstone bridge configuration. The two reference resistive wires may release heat to the stable reference gas based on a thermal conductivity of the stable reference gas (e.g., the higher the thermal conductivity of a gas, the more heat is conducted by and released to the gas). In other words, a temperature change, and thus a resistance change, of the two reference resistive wires may depend on a rate of thermal release of heat from the two reference resistive wires to the stable reference gas, which may depend on the thermal conductivity of the stable reference gas. The thermal conductivity of the stable reference gas is a known parameter. The two sense resistive wires may release heat to the measurement gas based on a thermal conductivity of the measurement gas. In other words, a temperature change, and thus a resistance change, of the two sense resistive wires may depend on a rate of thermal release of heat from the two sense resistive wires to the measurement gas, which may depend on the thermal conductivity of the measurement gas. The thermal conductivity of the measurement gas is an unknown parameter. For example, the thermal conductivity of the measurement gas may be related to a concentration of the target gas in the measurement gas.

The gas sensor may be configured to measure a differential signal output from the Wheatstone bridge configuration. The differential signal may represent a change in resistance of the sense resistive wires as compared to a change in resistance of the reference resistive wires generated by different rates of thermal release from the four resistive wires to the measurement gas and the stable reference gas, respectively. Thus, the concentration of the target gas may be measured based on the differential signal.

The differential signal used to measure the concentration of the target gas may be significantly smaller than offsets generated by external influences, such as ambient temperature, ambient pressure, production spread of the gas sensor, and lifetime drifts. The offsets can make it difficult for the gas sensor to obtain useful information from the differential signal. Thus, the offsets should be rejected in order to obtain the useful information from the differential signal.

In some cases, offset compensation may be performed in a digital domain by either implementing a compensation polynomial function taking all the offset factors into consideration, or inferring an offset directly from reading the gas sensor by applying a nominal voltage and performing the reading before the four resistive wires are heated up. However, both methods performed in the digital domain exhibit a problem by imposing a very wide dynamic range on an entire analog signal path of the gas sensor. A dynamic range is a range of variables across which an external influence may vary. For example, a dynamic range of ambient temperature may include all ambient temperatures in which the gas sensor may have to operate (e.g., −20° to over 100° F.). Likewise, a dynamic range of ambient temperature may be a include all ambient pressures in which the gas sensor may have to operate. The dynamic range of each external influence should be taken into account when compensating for the offsets. Moreover, the compensation polynomial function is complex, requires significant processing power, and may be unable to accurately take all offset factors into account over respective dynamic ranges.

Some implementations disclosed herein are directed to reducing an impact of a magnitude of an offset on a downstream signal path by performing an initial offset compensation measurement as an initial compensation step. The initial offset compensation measurement may be performed by applying a low input supply voltage (e.g., about 1V) across two input terminals of a resistive bridge circuit (e.g., a Wheatstone bridge configuration) and reading out a measurement signal (e.g., a differential signal) of the resistive bridge circuit while the low input supply voltage is applied. During the initial offset compensation measurement, a sensitivity of the resistive bridge circuit to thermal conductivity may be zero or close to zero while non-gas offset effects (e.g., external influences, such ambient temperature, ambient pressure, production spread of the gas sensor, and lifetime drifts) are still measurable. Thus, the non-gas offset effects may be isolated from a thermal conductivity sensitivity of the gas sensor. As a result, during the initial offset compensation measurement, the non-gas offset effects may be measured independently from the thermal conductivity sensitivity of the gas sensor to obtain an accurate measurement of all of the non-gas offset effects in a single measurement without factoring in each respective dynamic range of the non-gas offset effects. In other words, a single offset may be measured that takes into account all non-gas offset effects. Accordingly, a complexity of factoring in all non-gas offset effects for offset compensation can be reduced. As a result, processing power of the gas sensor can also be reduced.

Furthermore, since a magnitude of the measurement signal at the output of the resistive bridge circuit is directly proportional to the input supply voltage, using a low input supply voltage may reduce a magnitude of the offset, which may relax signal processing requirements on an analog signal path of the gas sensor. In other words, processing components arranged on the analog signal path may be simplified, which may reduce a complexity and a manufacturing costs of the gas sensor.

The offset measured during the initial offset compensation measurement may then be scaled according to a scaling factor, and then fed back to the analog signal path and subtracted from a measurement signal generated during an operational mode of the gas sensor. Thus, the measurement signal generated during the operational mode of the gas sensor may be compensated by the offset measured during the initial offset compensation measurement. The scaling factor may be determined based on a ratio of the input supply voltage used during the operational mode (e.g., 5V) and the low input supply voltage (e.g., 1V) used during the initial offset compensation measurement. For example, the scaling factor may be 5 when the input supply voltage used during the operational mode is 5V and the low input supply voltage used during the initial offset compensation measurement is 1V. By subtracting the offset from the measurement signal during the operational mode, a significantly smaller residual offset is output from the analog signal path that can be more easily compensated through other techniques in the digital domain. Since the residual offset is much smaller than would be otherwise be present at an output of the analog signal path, signal processing requirements of a digital signal path may be relaxed, which may result in reduced processing power, reduced complexity, and reduced manufacturing costs of the gas sensor.

FIG. 1 illustrates a gas sensor 100 according to one or more implementations. The gas sensor 100 may be a thermal conductivity (TC) sensor that uses a known thermal conductivity of a reference gas to measure a concentration of a target gas contained within a measurement gas. For example, the gas sensor 100 may be configured to measure a thermal conductivity of the measurement gas based on a measurement signal, and determine the concentration of the target gas based on the thermal conductivity of the measurement gas.

The gas sensor 100 may include a housing 102 or casing that includes a reference chamber 104 configured to contain a reference gas, and a measurement chamber 106 configured to contain a measurement gas (e.g., an ambient gas) that is different from the reference gas. The reference gas may be oxygen or nitrogen, but not limited thereto. In some implementations, the reference gas may be a vacuum gas. The measurement gas may be the target gas or may include the target gas. The target gas may be absent from the reference gas. The reference chamber 104 may be a sealed chamber. For example, in some implementations, the reference chamber 104 may be hermetically sealed. In addition, the housing 102 may have an opening 108 (e.g., a conduit) that allows the measurement gas to enter the measurement chamber 106. Thus, the opening 108 may be provided for fluidly connecting the measurement chamber 106 to the measurement gas.

The gas sensor 100 may include a plurality of resistive elements, such as piezoresistive wires. The plurality of resistive elements may be substantially identical in resistivity when the gas sensor 100 is in an off state (e.g., when an input supply voltage is not applied to the plurality of resistive elements). In some implementations, the gas sensor 100 may include a first piezoresistive wire 110, a second piezoresistive wire 112, a third piezoresistive wire 114, and a fourth piezoresistive wire 116. The first piezoresistive wire 110 may be arranged in the reference chamber 104 and may be exposed to the reference gas, the second piezoresistive wire 112 may be arranged in the reference chamber 104 and may be exposed to the reference gas, the third piezoresistive wire 114 may be arranged in the measurement chamber 106 and may be exposed to the measurement gas, and the fourth piezoresistive wire 116 arranged in the measurement chamber 106 and may be exposed to the measurement gas.

The plurality of resistive elements may be provided in a resistive bridge circuit, such as a full-bridge circuit (e.g., a Wheatstone bridge). In other words, the plurality of resistive elements may be connected in a full-bridge configuration that includes two input terminals, to which an input voltage is applied, and two output terminals, from which a differential signal (e.g., a differential voltage) is output as a measurement signal. In other words, the full-bridge circuit may be configured to receive the input voltage and generate the differential signal at a differential output of the resistive bridge circuit based on the input voltage. The first piezoresistive wire 110 and the second piezoresistive wire 112 may be arranged on opposite segments of the full-bridge circuit. For example, the full-bridge circuit may include two half-bridges, including a first half-bridge and a second half-bridge. The first piezoresistive wire 110 may be arranged in the first half-bridge and the second piezoresistive wire 112 may be arranged in the second half-bridge. The first piezoresistive wire 110 may be arrange diagonally across from the second piezoresistive wire 112. The third piezoresistive wire 114 and the fourth piezoresistive wire 116 may also be arranged on opposite segments of the full-bridge circuit. For example, the third piezoresistive wire 114 may be arranged in the first half-bridge and the fourth piezoresistive wire 116 may be arranged in the second half-bridge. The third piezoresistive wire 114 may be arrange diagonally across from the fourth piezoresistive wire 116. Thus, each half-bridge is formed by one measurement piezoresistive wire and one reference piezoresistive wire.

In some implementations, only a single half-bridge may be used. For example, the plurality of resistive elements may include only two resistive wires. In this case, the resistive bridge circuit may only include the first piezoresistive wire 110 and the third piezoresistive wire 114, for example. The single half-bridge may be configured to output a measurement signal from an output node arranged and coupled between the two resistive wires. The measurement signal may represent a change in resistance of the first piezoresistive wire 110 as compared to a change in resistance of the third piezoresistive wire 114 generated by different rates of thermal release from the two resistive wires to the measurement gas and the reference gas, respectively. Thus, the concentration of the target gas may be measured based on the measurement signal.

As indicated above, FIG. 1 is provided as an example. Other examples may differ from what is described with regard to FIG. 1. The number and arrangement of devices and components shown in FIG. 1 are provided as an example. In practice, there may be additional devices or components, fewer devices or components, different devices or components, or differently arranged devices or components than those shown in FIG. 1.

Figure 2:
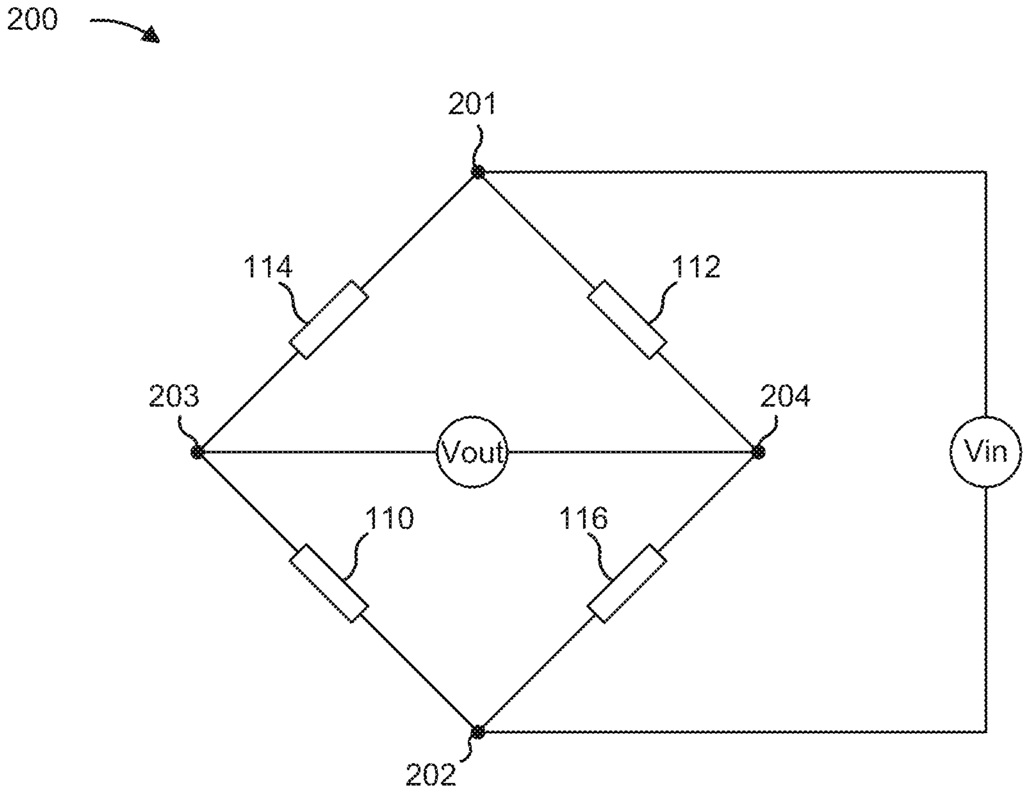
FIG. 2 illustrates a resistive bridge circuit according to one or more implementations.

FIG. 2 illustrates a resistive bridge circuit 200 according to one or more implementations. The resistive bridge circuit 200 may include the first piezoresistive wire 110, the second piezoresistive wire 112, the third piezoresistive wire 114, and the fourth piezoresistive wire 116 connected in a full-bridge configuration. The resistive bridge circuit 200 includes a first half-bridge on a left side and a second half-bridge on a right side. The first piezoresistive wire 110 may be arranged in the first half-bridge and the second piezoresistive wire 112 may be arranged in the second half-bridge. The first piezoresistive wire 110 may be arrange diagonally across from the second piezoresistive wire 112. The third piezoresistive wire 114 and the fourth piezoresistive wire 116 may also be arranged on opposite segments of the full-bridge circuit. For example, the third piezoresistive wire 114 may be arranged in the first half-bridge and the fourth piezoresistive wire 116 may be arranged in the second half-bridge. The third piezoresistive wire 114 may be arrange diagonally across from the fourth piezoresistive wire 116. Thus, each half-bridge is formed by one measurement piezoresistive wire and one reference piezoresistive wire.

The resistive bridge circuit 200 may include two input terminals, including a first input terminal 201 and a second input terminal 202. An input voltage Vin may be applied to the first input terminal 201 and the second input terminal 202. In other words, the input voltage Vin is applied across the two input terminals. A voltage level of the input voltage Vin may be controlled by a controller. The resistive bridge circuit 200 may further include two output terminals, including a first output terminal 203 and a second output terminal 204. Applying the input voltage Vin to the two input terminals cases the resistive bridge circuit 200 to generate a differential signal Vout (e.g., an output voltage) at the two output terminals. The differential signal Vout may be measured across the two output terminals and may be used by the gas sensor 100 as a measurement signal.

The differential signal Vout may depend on the voltage level of the input voltage Vin and respective resistances of the first piezoresistive wire 110, the second piezoresistive wire 112, the third piezoresistive wire 114, and the fourth piezoresistive wire 116. For example, the first piezoresistive wire 110, the second piezoresistive wire 112, the third piezoresistive wire 114, and the fourth piezoresistive wire 116 may undergo a temperature change (e.g., a temperature increase) by applying or by increasing the input voltage Vin across the two input terminals 201 and 202 of the resistive bridge circuit 200. Alternatively, the piezoresistive wires 110, 112, 114, and 116 may undergo a temperature decrease by either decreasing the input voltage Vin or removing the input voltage Vin.

When applying the input voltage Vin (e.g., from an off-state) or increasing the input voltage Vin, the piezoresistive wires 110, 112, 114, and 116 may heat up depending on the voltage level of the input voltage Vin. A temperature change of the piezoresistive wires 110, 112, 114, and 116 may occur at different rates based on an exposure of the first piezoresistive wire 110 and the second piezoresistive wire 112 to the reference gas and based on an exposure of the third piezoresistive wire 114 and the fourth piezoresistive wire 116 to the measurement gas.

For example, the first piezoresistive wire 110 and the second piezoresistive wire 112 may release heat to the reference gas based on a thermal conductivity of the reference gas. In other words, a temperature change, and thus a resistance change, of the first piezoresistive wire 110 and the second piezoresistive wire 112 may depend on a rate of thermal release of heat from the first piezoresistive wire 110 and the second piezoresistive wire 112 to the reference gas, which may depend on the thermal conductivity of the reference gas.

The third piezoresistive wire 114 and the fourth piezoresistive wire 116 may release heat to the measurement gas based on a thermal conductivity of the measurement gas. In other words, a temperature change, and thus a resistance change, of the third piezoresistive wire 114 and the fourth piezoresistive wire 116 may depend on a rate of thermal release of heat from the third piezoresistive wire 114 and the fourth piezoresistive wire 116 to the measurement gas, which may depend on the thermal conductivity of the measurement gas, which may be related to a concentration of the target gas in the measurement gas.

The gas sensor 100 may be configured to measure the differential signal Vout output from the resistive bridge circuit 200. The differential signal Vout may represent a change in resistance of the third piezoresistive wire 114 and the fourth piezoresistive wire 116 relative to a change in resistance of the first piezoresistive wire 110 and the second piezoresistive wire 112 produced by different rates of thermal release from the piezoresistive wires to the measurement gas and the reference gas, respectively. Thus, the concentration of the target gas may be measured based on the differential signal Vout.

As indicated above, FIG. 2 is provided as an example. Other examples may differ from what is described with regard to FIG. 2.

Figure 3:
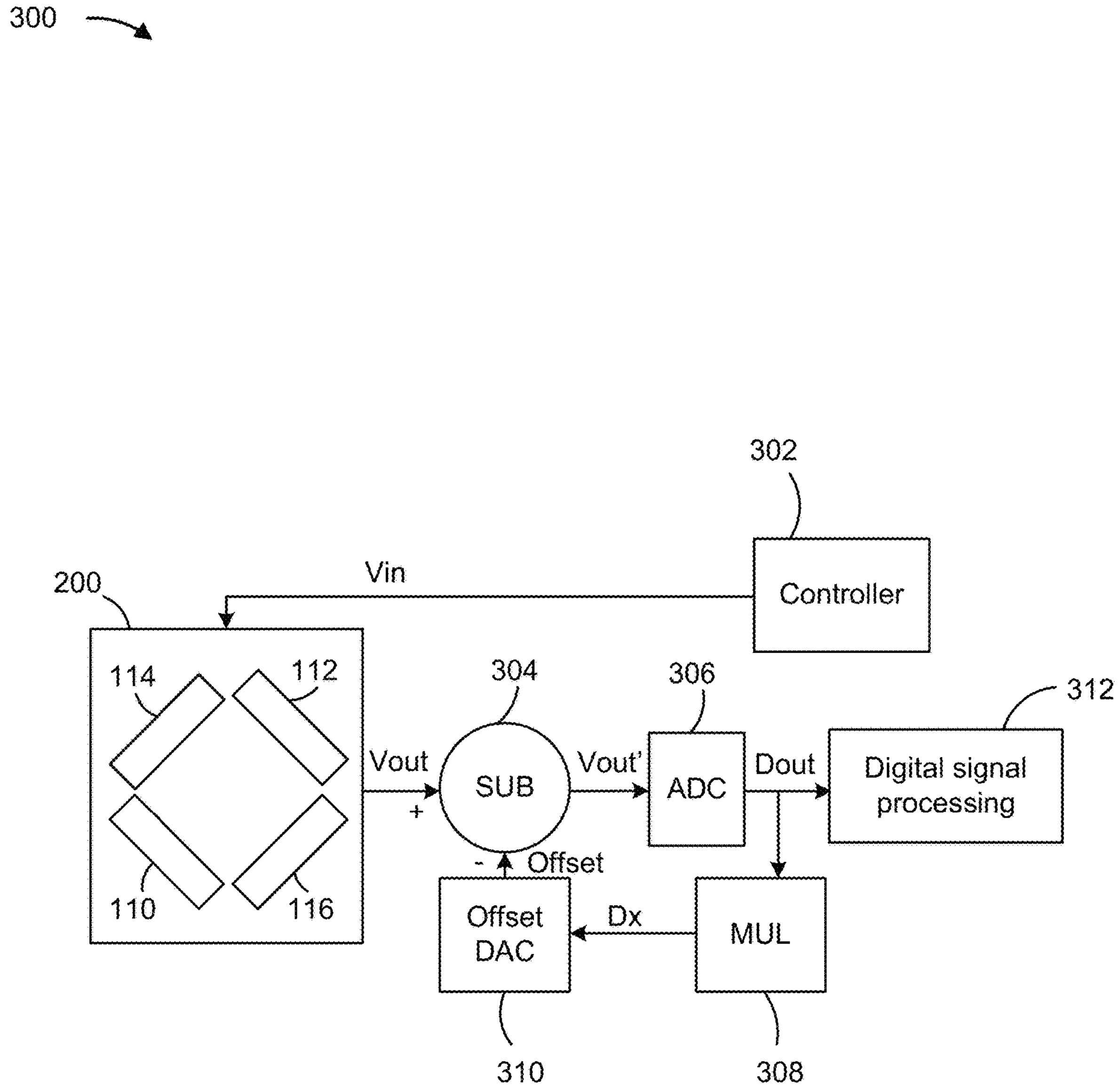
FIG. 3 illustrates a schematic block diagram of a measurement circuit of a gas sensor according to one or more implementations.

FIG. 3 illustrates a schematic block diagram of a measurement circuit 300 of a gas concentration sensor according to one or more implementations. The measurement circuit 300 may be implemented as part of the gas sensor described in connection with FIGS. 1 and 2. For example, the measurement circuit 300 may include the piezoresistive wires 110, 112, 114, and 116 arranged in the resistive bridge circuit 200. In addition, the measurement circuit 300 may include a controller 302, a subtractor 304 (e.g., a subtractor component) arranged on an analog signal path, an analog-to-digital converter (ADC) 306, a scaler 308 (e.g., a multiplier), an offset digital-to-analog converter (DAC) 310, and a digital signal processing circuit 312. The scaler 308 and the offset DAC 310 may be arranged in a compensation feedback path.

The controller 302 may be a supply voltage controller that may be configured to control a voltage level of the input voltage Vin. For example, the measurement circuit 300 may be configurable in a calibration mode and an operational mode. During the calibration mode, the measurement circuit 300 may be configured to measure an offset that accounts for one or more non-gas offset effects. During the operational mode, the measurement circuit 300 may be configured to measure a concentration of the target gas that may be present in the measurement gas. During the operational mode, the measurement circuit 300 may compensate the differential signal Vout that is output from the resistive bridge circuit 200 based on the offset measured during the calibration mode in order to generate a compensated differential signal Vout'.

During the calibration mode, the controller 302 may control the input voltage Vin such that the input voltage Vin has a first voltage value at which the resistive bridge circuit 200 has a negligible sensitivity to thermal conductivity such that the differential signal Vout is representative of an offset (e.g., an offset value). In other words, at the first voltage value, the piezoresistive wires 110, 112, 114, and 116 may be substantially insensitive to thermal conductivity and sensitive primarily to non-gas offset effects. Thus, during the calibration mode, the differential signal Vout may be sensitive to the non-gas offset effects and may not be influenced (e.g., to a measurable degree) by a thermal conductivity of the measurement gas and a thermal conductivity the reference gas. In contrast, during the operational mode, the controller 302 may control the input voltage Vin such that the input voltage Vin has a second voltage value at which the resistive bridge circuit 200 is sensitive to thermal conductivity with an operational sensitivity such that the differential signal Vout is representative of a thermal conductivity of the measurement gas (e.g., of the target gas). In other words, at the second voltage value, the piezoresistive wires 110, 112, 114, and 116 may be sensitive to the thermal conductivity of the measurement gas and the thermal conductivity the reference gas. Thus, during the operational mode, the differential signal Vout may be influenced by the thermal conductivity of the measurement gas. Thus, by configuring the measurement circuit 300 into the calibration mode, the offset induced by the non-gas offset effects can be isolated from the thermal conductivity and used to compensate the differential signal Vout during the operational mode.

The measurement circuit 300 may be configured to, during the calibration mode, measure the offset based on the differential signal Vout, and, during the operational mode, subtract the offset (e.g., the offset value) from the differential signal Vout to generate the compensated differential signal Vout'. As a result, during the operational mode, the compensated differential signal Vout' may be a more accurate representation of the thermal conductivity of the measurement gas (e.g., of the target gas) than the differential signal Vout.

The first voltage value is less than the second voltage value. For example, in some implementations, the first voltage value may be less than 1.5V and the second voltage value may be greater than 3.5V. The first voltage value may be set such that the negligible sensitivity to thermal conductivity is at least two orders of magnitude less than the operational sensitivity to thermal conductivity. In other words, the piezoresistive wires 110, 112, 114, and 116 may be at least 100 times less sensitive to thermal conductivity during the calibration mode than during the operational mode.

During the calibration mode, the input voltage Vin may cause the first piezoresistive wire 110, the second piezoresistive wire 112, the third piezoresistive wire 114, and the fourth piezoresistive wire 116 to undergo a negligible temperature change such that the differential signal Vout is a measure of at least one offset effect (e.g., at least one non-gas offset effect, such as pressure, temperature, production spread, or lifetime drift). For example, during the calibration mode, the input voltage Vin may cause the first piezoresistive wire 110 and the second piezoresistive wire 112 to undergo a first change in resistance based on at least one offset effect, and may cause the third piezoresistive wire 114 and the fourth piezoresistive wire 116 to undergo a second change in resistance based on the at least one offset effect.

During the operational mode, the input voltage Vin may cause the first piezoresistive wire 110 and the second piezoresistive wire 112 to undergo a first temperature increase based on a first rate of thermal release to the reference gas, and may cause the third piezoresistive wire 114 and the fourth piezoresistive wire 116 to undergo a second temperature increase based on a second rate of thermal release to the target gas. For example, during the operational mode, the input voltage Vin may cause the first piezoresistive wire 110 and the second piezoresistive wire 112 to undergo a third change in resistance based on a first thermal interaction of the first piezoresistive wire 110 and the second piezoresistive wire 112 with the reference gas. Additionally, during the operational mode, the input voltage Vin causes the third piezoresistive wire 114 and the fourth piezoresistive wire 116 to undergo a fourth change in resistance based on a second thermal interaction of the third piezoresistive wire 114 and the fourth piezoresistive wire 116 with the measurement gas (e.g., with the target gas). In other words, during the operational mode, the input voltage Vin may cause the first piezoresistive wire 110 and the second piezoresistive wire 112 to undergo the third change in resistance based on a thermal conductivity of the reference gas, and may cause the third piezoresistive wire 114 and the fourth piezoresistive wire 116 to undergo the fourth change in resistance based on the thermal conductivity of the target gas (e.g., of the target gas).

The subtractor 304 may be configured to receive the differential signal Vout from the resistive bridge circuit 200. During the calibration mode, the offset DAC 310 may not provide an analog offset signal to the subtractor 304 (e.g., an output of the offset DAC 310 may be disabled or set to zero). As a result, during the calibration mode, the differential signal Vout may pass through the subtractor 304 unchanged. In other words, during the calibration mode, the subtractor 304 may output the differential signal Vout to the ADC 306. During the operational mode, the offset DAC 310 may provide the analog offset signal having an offset value determined during the calibration mode, and the subtractor 304 may subtract the offset value from the differential signal Vout to generate the compensated differential signal Vout'.

The ADC 306 is coupled to an output of the subtractor 304. During the calibration mode, the ADC 306 may generate a digital signal Dout based on the differential signal Vout provided by the subtractor 304. For example, the ADC 306 may convert the differential signal Vout into the digital signal Dout. The digital signal Dout is proportional to the offset based on a ratio of the second voltage value to the first voltage value. Thus, during the calibration mode, the scaler 308 may scale up or multiply the digital signal Dout by a scaling factor to generate a scaled digital signal Dx that is equal to the offset (e.g., equal to the offset value to be applied to the subtractor 304 during the operational mode). The scaling factor may be equal to the ratio of the second voltage value to the first voltage value. For example, if the second voltage value is 5V and the first voltage value is 1V, the scaling factor is 5. Thus, the scaled digital signal Dx may be 5 times greater than the digital signal Dout. The offset DAC 310 may receive the scaled digital signal Dx and generate the analog offset signal based on the scaled digital signal Dx. For example, during the calibration mode, the offset DAC 310 may convert the scaled digital signal Dx to an analog value and store the analog value as the offset value to be used during the operational mode. During the operational mode, the offset DAC 310 may output the analog offset signal with the stored offset value that is to be subtracted from the differential signal by the subtractor 304. Accordingly, during the operational mode, the subtractor 304 may generate the compensated differential signal Vout' by subtracting the offset value from the differential signal Vout in order to perform an offset compensation. Finally, during the operational mode, the ADC 306 may convert the compensated differential signal Vout' into a digital measurement signal Dout that is representative of the thermal conductivity of the measurement gas (e.g., of the target gas). The ADC 306 may provide the digital measurement signal Dout to the digital signal processing circuit 312 for further digital processing.

Accordingly, a single offset may be measured during the calibration mode that takes into account one or more (e.g., all) non-gas offset effects. Accordingly, a complexity of factoring in all non-gas offset effects for offset compensation can be reduced. As a result, processing power of the gas sensor can also be reduced.

Furthermore, since a magnitude of the differential signal Vout is directly proportional to the input supply voltage, using a low input voltage may reduce a magnitude of the offset, which may relax signal processing requirements on the analog signal path of the gas sensor 100. In other words, processing components arranged on the analog signal path may be simplified, which may reduce a complexity and a manufacturing costs of the gas sensor 100. Moreover, by subtracting the offset from the differential signal Vout during the operational mode, a significantly smaller residual offset is output from the analog signal path that can be more easily compensated through other techniques in the digital domain. Since the residual offset is much smaller than would be otherwise be present at an output of the analog signal path, signal processing requirements of a digital signal path of the digital signal processing circuit 312 may be relaxed, which may result in reduced processing power, reduced complexity, and reduced manufacturing costs of the digital signal processing circuit 312.

As indicated above, FIG. 3 is provided as an example. Other examples may differ from what is described with regard to FIG. 3. The number and arrangement of devices and components shown in FIG. 3 are provided as an example. In practice, there may be additional devices or components, fewer devices or components, different devices or components, or differently arranged devices or components than those shown in FIG. 3.

ASPECTS

The following provides an overview of some Aspects of the present disclosure:

Aspect 1: A gas concentration sensor configured to measure a gas concentration of a target gas, comprising: a reference chamber configured to contain a reference gas; a measurement chamber configured to contain a target gas that is different from the reference gas; and a measurement circuit configurable in a calibration mode and an operational mode, the measurement circuit comprising: a full-bridge circuit comprising a first piezoresistive wire arranged in the reference chamber and exposed to the reference gas, a second piezoresistive wire arranged in the reference chamber and exposed to the reference gas, a third piezoresistive wire arranged in the measurement chamber and exposed to the target gas, and a fourth piezoresistive wire arranged in the measurement chamber and exposed to the target gas, wherein the full-bridge circuit is configured to receive an input voltage and generate a differential signal based on the input voltage, wherein, during the calibration mode, the input voltage has a first voltage value at which the full-bridge circuit has a negligible sensitivity to thermal conductivity such that the differential signal is representative of an offset, wherein, during the operational mode, the input voltage has a second voltage value at which the full-bridge circuit is sensitive to thermal conductivity with an operational sensitivity such that the differential signal is representative of a thermal conductivity of the target gas, wherein the measurement circuit is configured to, during the calibration mode, measure the offset based on the differential signal, and wherein the measurement circuit is configured to, during the operational mode, subtract the offset from the differential signal to generate a compensated differential signal.

Aspect 2: The gas concentration sensor of Aspect 1, wherein, during the operational mode, the compensated differential signal is a more accurate representation of the thermal conductivity of the target gas than the differential signal.

Aspect 3: The gas concentration sensor of any of Aspects 1-2, wherein the first voltage value is less than the second voltage value.

Aspect 4: The gas concentration sensor of any of Aspects 1-3, wherein the negligible sensitivity to thermal conductivity is at least two orders of magnitude less than the operational sensitivity to thermal conductivity.

Aspect 5: The gas concentration sensor of any of Aspects 1-4, wherein, during the calibration mode, the input voltage causes the first piezoresistive wire, the second piezoresistive wire, the third piezoresistive wire, and the fourth piezoresistive wire to undergo a negligible temperature change such that the differential signal is a measure of at least one offset effect.

Aspect 6: The gas concentration sensor of Aspect 5, wherein the at least one offset effect includes at least one of pressure, temperature, production spread, or lifetime drift.

Aspect 7: The gas concentration sensor of Aspect 5, wherein, during the operational mode, the input voltage causes the first piezoresistive wire and the second piezoresistive wire to undergo a first temperature increase based on a first rate of thermal release to the reference gas, and wherein, during the operational mode, the input voltage causes the third piezoresistive wire and the fourth piezoresistive wire to undergo a second temperature increase based on a second rate of thermal release to the target gas.

Aspect 8: The gas concentration sensor of any of Aspects 1-7, wherein the measurement circuit further comprises: a subtractor component configured to receive the differential signal, wherein the subtractor component is configured to, during the calibration mode, output the differential signal, and wherein the subtractor component is configured to, during the operational mode, subtract the offset from the differential signal to generate the compensated differential signal.

Aspect 9: The gas concentration sensor of Aspect 8, wherein the measurement circuit further comprises: an ADC coupled to an output of the subtractor component, wherein the ADC is configured to, during the calibration mode, generate a digital signal based on the differential signal; a scaler configured to, during the calibration mode, scale up the digital signal by a scaling factor to generate a scaled digital signal that is equal to the offset, wherein the scaling factor is equal to a ratio of the second voltage value to the first voltage value; and a DAC configured to receive the scaled digital signal and generate an analog offset signal based on the scaled digital signal.

Aspect 10: The gas concentration sensor of Aspect 9, wherein the DAC is configured to, during the operation mode, provide the analog offset signal to the subtractor component, and wherein the subtractor component is configured to, during the operational mode, subtract the analog offset signal from the differential signal to generate the compensated differential signal.

Aspect 11: The gas concentration sensor of Aspect 9, wherein the ADC is configured to, during the operational mode, convert the compensated differential signal into a digital measurement signal that is representative of the thermal conductivity of the target gas.

Aspect 12: A gas concentration sensor configured to measure a gas concentration of a target gas, comprising: a reference chamber configured to contain a reference gas; a measurement chamber configured to contain the target gas that is different from the reference gas; and a measurement circuit configurable in a calibration mode and an operational mode, the measurement circuit comprising: a resistive bridge circuit comprising a plurality of resistive elements, including at least one first resistive element arranged in the reference chamber and at least one second resistive element arranged in the measurement chamber, wherein the resistive bridge circuit is configured to receive an input voltage and generate a measurement signal based on the input voltage, wherein, during the calibration mode, the input voltage has a first voltage value at which the resistive bridge circuit has a negligible sensitivity to thermal conductivity such that the measurement signal is representative of an offset, wherein, during the operational mode, the input voltage has a second voltage value at which the resistive bridge circuit is sensitive to thermal conductivity with an operational sensitivity such that the measurement signal is representative of a thermal conductivity of the target gas, wherein the measurement circuit is configured to, during the calibration mode, measure the offset based on the measurement signal, and wherein the measurement circuit is configured to, during the operational mode, subtract the offset from the measurement signal to generate a compensated measurement signal.

Aspect 13: The gas concentration sensor of Aspect 12, wherein, during the operational mode, the compensated measurement signal is a more accurate representation of the thermal conductivity of the target gas than the measurement signal.

Aspect 14: The gas concentration sensor of any of Aspects 12-13, wherein the first voltage value is less than the second voltage value.

Aspect 15: The gas concentration sensor of any of Aspects 12-14, wherein the negligible sensitivity to thermal conductivity is at least two orders of magnitude less than the operational sensitivity to thermal conductivity.

Aspect 16: The gas concentration sensor of any of Aspects 12-15, wherein, during the calibration mode, the input voltage causes the at least one first resistive element to undergo a first change in resistance based on at least one offset effect, and wherein, during the calibration mode, the input voltage causes the at least one second resistive element to undergo a second change in resistance based on the at least one offset effect.

Aspect 17: The gas concentration sensor of Aspect 16, wherein, during the operational mode, the input voltage causes the at least one first resistive element to undergo a third change in resistance based on a first thermal interaction of the at least one first resistive element with the reference gas, and wherein, during the operational mode, the input voltage causes the at least one second resistive element to undergo a fourth change in resistance based on a second thermal interaction of the at least one second resistive element with the target gas.

Aspect 18: The gas concentration sensor of Aspect 16, wherein, during the operational mode, the input voltage causes the at least one first resistive element to undergo a third change in resistance based on a thermal conductivity of the reference gas, and wherein, during the operational mode, the input voltage causes the at least one second resistive element to undergo a fourth change in resistance based on the thermal conductivity of the target gas.

Aspect 19: A method of calibrating an offset of a gas concentration sensor, the method comprising: configuring a measurement circuit of the gas concentration sensor in a calibration mode; applying, during the calibration mode, a first input voltage to a resistive bridge circuit of the gas concentration sensor to cause the resistive bridge circuit to generate a first measurement signal, wherein, based on the first input voltage, the resistive bridge circuit has a negligible sensitivity to thermal conductivity such that the first measurement signal is representative of the offset; configuring, during the calibration mode, a compensation component of the measurement circuit with the offset derived from the first measurement signal; configuring the measurement circuit of the gas concentration sensor in an operational mode; applying, during the operational mode, a second input voltage to the resistive bridge circuit of the gas concentration sensor to cause the resistive bridge circuit to generate a second measurement signal, wherein the second input voltage is greater than the first input voltage, and wherein, based on the second input voltage, the resistive bridge circuit is sensitive to thermal conductivity with an operational sensitivity such that the second measurement signal is representative of a thermal conductivity of a measurement gas; and subtracting, during the operational mode, the offset configured at the compensation component from the second measurement signal to generate a compensated measurement signal.

Aspect 20: The method of Aspect 19, wherein the negligible sensitivity to thermal conductivity is at least two orders of magnitude less than the operational sensitivity to thermal conductivity.

Aspect 21: A system configured to perform one or more operations recited in one or more of Aspects 1-20.

Aspect 22: An apparatus comprising means for performing one or more operations recited in one or more of Aspects 1-20.

Aspect 23: A non-transitory computer-readable medium storing a set of instructions, the set of instructions comprising one or more instructions that, when executed by a device, cause the device to perform one or more operations recited in one or more of Aspects 1-20.

Aspect 24: A computer program product comprising instructions or code for executing one or more operations recited in one or more of Aspects 1-20.

The foregoing disclosure provides illustration and description, but is not intended to be exhaustive or to limit the implementations to the precise form disclosed. Modifications and variations are possible in light of the above disclosure or may be acquired from practice of the implementations.

Some implementations may be described herein in connection with thresholds. As used herein, "satisfying" a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As used herein, the term "component" is intended to be broadly construed as hardware, firmware, or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be configured to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein refers to any of the foregoing structures or any other structure suitable for implementation of the techniques described herein. Software may be stored on a non-transitory computer-readable medium such that the non-transitory computer readable medium includes a program code or a program algorithm stored thereon which, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A gas concentration sensor configured to measure a gas concentration of a target gas, comprising:
- a reference chamber configured to contain a reference gas;
- a measurement chamber configured to contain a target gas that is different from the reference gas; and
- a measurement circuit configurable in a calibration mode and an operational mode, the measurement circuit comprising:
  - a full-bridge circuit comprising a first piezoresistive wire arranged in the reference chamber and exposed to the reference gas, a second piezoresistive wire arranged in the reference chamber and exposed to the reference gas, a third piezoresistive wire arranged in the measurement chamber and exposed to the target gas, and a fourth piezoresistive wire arranged in the measurement chamber and exposed to the target gas,
  - wherein the full-bridge circuit is configured to receive an input voltage and generate a differential signal based on the input voltage,
  - wherein, during the calibration mode, the input voltage has a first voltage value at which the full-bridge circuit has a negligible sensitivity to thermal conductivity such that the differential signal is representative of an offset,
  - wherein, during the operational mode, the input voltage has a second voltage value at which the full-bridge circuit is sensitive to thermal conductivity with an operational sensitivity such that the differential signal is representative of a thermal conductivity of the target gas,
  - wherein the measurement circuit is configured to, during the calibration mode, measure the offset based on the differential signal, and
  - wherein the measurement circuit is configured to, during the operational mode, subtract the offset from the differential signal to generate a compensated differential signal.

2. The gas concentration sensor of claim 1, wherein, during the operational mode, the compensated differential signal is a more accurate representation of the thermal conductivity of the target gas than the differential signal.

3. The gas concentration sensor of claim 1, wherein the first voltage value is less than the second voltage value.

4. The gas concentration sensor of claim 1, wherein the negligible sensitivity to thermal conductivity is at least two orders of magnitude less than the operational sensitivity to thermal conductivity.

5. The gas concentration sensor of claim 1, wherein, during the calibration mode, the input voltage causes the first piezoresistive wire, the second piezoresistive wire, the third piezoresistive wire, and the fourth piezoresistive wire to undergo a negligible temperature change such that the differential signal is a measure of at least one offset effect.

6. The gas concentration sensor of claim 5, wherein the at least one offset effect includes at least one of pressure, temperature, production spread, or lifetime drift.

7. The gas concentration sensor of claim 5,
- wherein, during the operational mode, the input voltage causes the first piezoresistive wire and the second piezoresistive wire to undergo a first temperature increase based on a first rate of thermal release to the reference gas, and
- wherein, during the operational mode, the input voltage causes the third piezoresistive wire and the fourth piezoresistive wire to undergo a second temperature increase based on a second rate of thermal release to the target gas.

8. The gas concentration sensor of claim 1, wherein the measurement circuit further comprises:
- a subtractor component configured to receive the differential signal,
- wherein the subtractor component is configured to, during the calibration mode, output the differential signal, and
- wherein the subtractor component is configured to, during the operational mode, subtract the offset from the differential signal to generate the compensated differential signal.

9. The gas concentration sensor of claim 8, wherein the measurement circuit further comprises:
- an analog-to-digital converter (ADC) coupled to an output of the subtractor component,
  - wherein the ADC is configured to, during the calibration mode, generate a digital signal based on the differential signal;
- a scaler configured to, during the calibration mode, scale up the digital signal by a scaling factor to generate a scaled digital signal that is equal to the offset,
  - wherein the scaling factor is equal to a ratio of the second voltage value to the first voltage value; and
- a digital-to-analog converter (DAC) configured to receive the scaled digital signal and generate an analog offset signal based on the scaled digital signal.

10. The gas concentration sensor of claim 9, wherein the DAC is configured to, during the operation mode, provide the analog offset signal to the subtractor component, and wherein the subtractor component is configured to, during the operational mode, subtract the analog offset signal from the differential signal to generate the compensated differential signal.

11. The gas concentration sensor of claim 9, wherein the ADC is configured to, during the operational mode, convert the compensated differential signal into a digital measurement signal that is representative of the thermal conductivity of the target gas.

12. A gas concentration sensor configured to measure a gas concentration of a target gas, comprising:

a reference chamber configured to contain a reference gas;

a measurement chamber configured to contain the target gas that is different from the reference gas; and a measurement circuit configurable in a calibration mode and an operational mode, the measurement circuit comprising:

a resistive bridge circuit comprising a plurality of resistive elements, including at least one first resistive element arranged in the reference chamber and at least one second resistive element arranged in the measurement chamber, wherein the resistive bridge circuit is configured to receive an input voltage and generate a measurement signal based on the input voltage, wherein, during the calibration mode, the input voltage has a first voltage value at which the resistive bridge circuit has a negligible sensitivity to thermal conductivity such that the measurement signal is representative of an offset, wherein, during the operational mode, the input voltage has a second voltage value at which the resistive bridge circuit is sensitive to thermal conductivity with an operational sensitivity such that the measurement signal is representative of a thermal conductivity of the target gas, wherein the measurement circuit is configured to, during the calibration mode, measure the offset based on the measurement signal, and wherein the measurement circuit is configured to, during the operational mode, subtract the offset from the measurement signal to generate a compensated measurement signal.

13. The gas concentration sensor of claim 12, wherein, during the operational mode, the compensated measurement signal is a more accurate representation of the thermal conductivity of the target gas than the measurement signal.

14. The gas concentration sensor of claim 12, wherein the first voltage value is less than the second voltage value.

15. The gas concentration sensor of claim 12, wherein the negligible sensitivity to thermal conductivity is at least two orders of magnitude less than the operational sensitivity to thermal conductivity.

16. The gas concentration sensor of claim 12, wherein, during the calibration mode, the input voltage causes the at least one first resistive element to undergo a first change in resistance based on at least one offset effect, and wherein, during the calibration mode, the input voltage causes the at least one second resistive element to undergo a second change in resistance based on the at least one offset effect.

17. The gas concentration sensor of claim 16, wherein, during the operational mode, the input voltage causes the at least one first resistive element to undergo a third change in resistance based on a first thermal interaction of the at least one first resistive element with the reference gas, and wherein, during the operational mode, the input voltage causes the at least one second resistive element to undergo a fourth change in resistance based on a second thermal interaction of the at least one second resistive element with the target gas.

18. The gas concentration sensor of claim 16, wherein, during the operational mode, the input voltage causes the at least one first resistive element to undergo a third change in resistance based on a thermal conductivity of the reference gas, and wherein, during the operational mode, the input voltage causes the at least one second resistive element to undergo a fourth change in resistance based on the thermal conductivity of the target gas.

19. A method of calibrating an offset of a gas concentration sensor, the method comprising:

configuring a measurement circuit of the gas concentration sensor in a calibration mode;

applying, during the calibration mode, a first input voltage to a resistive bridge circuit of the gas concentration sensor to cause the resistive bridge circuit to generate a first measurement signal, wherein, based on the first input voltage, the resistive bridge circuit has a negligible sensitivity to thermal conductivity such that the first measurement signal is representative of the offset;

configuring, during the calibration mode, a compensation component of the measurement circuit with the offset derived from the first measurement signal;

configuring the measurement circuit of the gas concentration sensor in an operational mode;

applying, during the operational mode, a second input voltage to the resistive bridge circuit of the gas concentration sensor to cause the resistive bridge circuit to generate a second measurement signal, wherein the second input voltage is greater than the first input voltage, and wherein, based on the second input voltage, the resistive bridge circuit is sensitive to thermal conductivity with an operational sensitivity such that the second measurement signal is representative of a thermal conductivity of a measurement gas; and subtracting, during the operational mode, the offset configured at the compensation component from the second measurement signal to generate a compensated measurement signal.

20. The method of claim 19, wherein the negligible sensitivity to thermal conductivity is at least two orders of magnitude less than the operational sensitivity to thermal conductivity.

* * * * *